Patented Feb. 23, 1926.

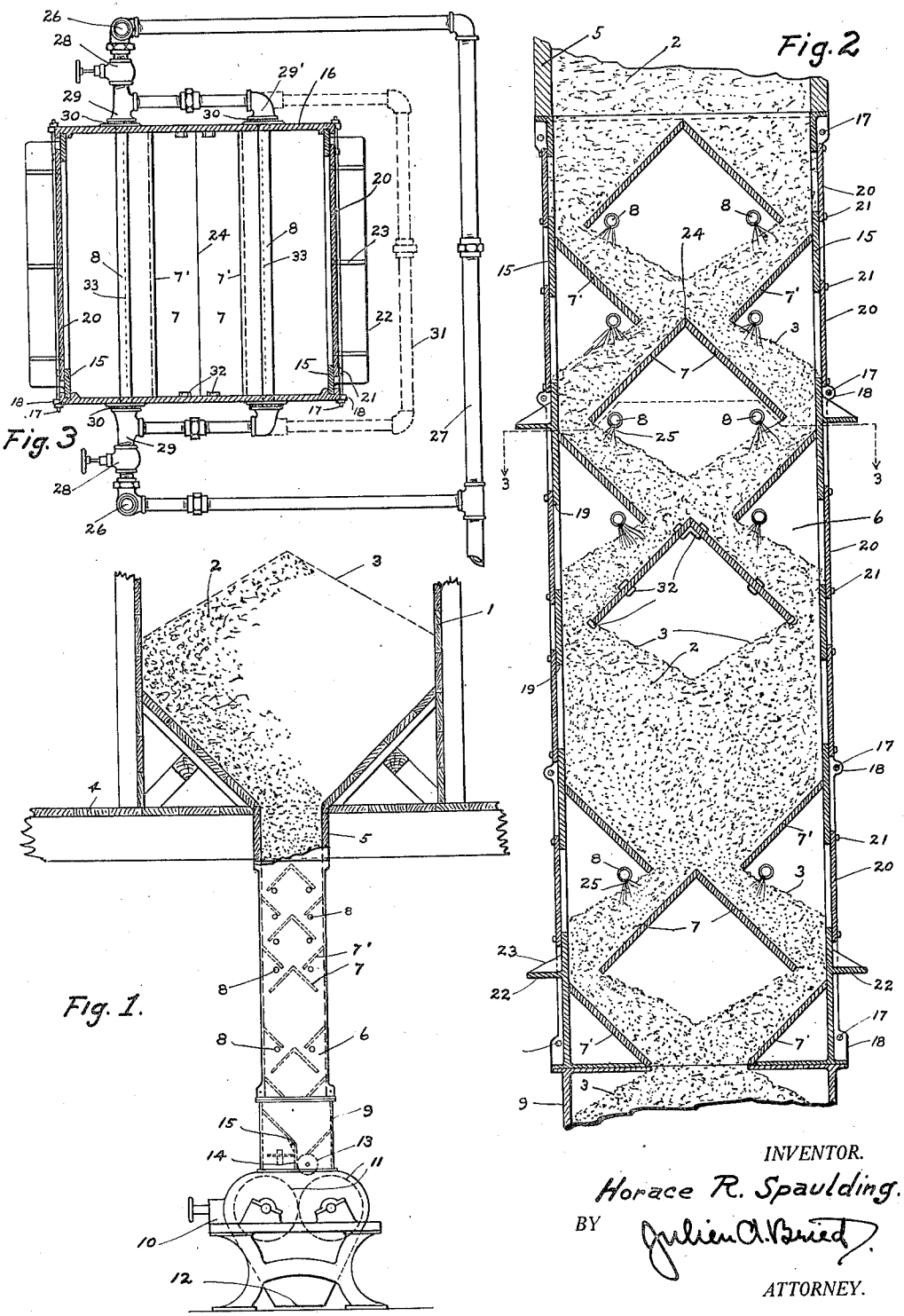
Feb. 23, 1926.  1,574,210
H. R. SPAULDING
METHOD AND APPARATUS FOR STEAMING GRAIN AND THE LIKE
Filed Oct. 29, 1924
INVENTOR.
Horace R. Spaulding.
BY
ATTORNEY.

1,574,210

UNITED STATES PATENT OFFICE.

HORACE R. SPAULDING, OF SAN FRANCISCO, CALIFORNIA.

METHOD AND APPARATUS FOR STEAMING GRAIN AND THE LIKE.

Application filed October 29, 1924. Serial No. 746,699.

*To all whom it may concern:*

Be it known that I, HORACE R. SPAULDING, a citizen of the United States, residing at San Francisco, in the county of San Francisco and State of California, have invented new and useful Improvements in a Method and Apparatus for Steaming Grain and the like, of which the following is a specification and which is illustrated in the accompanying drawings.

This invention relates to the steaming of grain and the like, principally in preparing the material for crushing or rolling to flake the same, and in order to prevent powdering or granulating of the material in passing through the crushing rolls.

The objects of the invention are to provide a method of handling the material and applying the steam which will produce a more evenly treated material, which will be under thorough control as to the amount of steaming of the material, and also provide apparatus to carry out the method which will be simple and effective in operation, and operate without the application of power to transport the material through the steaming operations, and such apparatus which may be connected directly to and beneath the storage bin containing the supply of material to progressively receive the entire contents thereof.

In the drawings Figure 1 is an elevation, partly in section, of the preferred apparatus to carry out my invention or method of steaming, and shows the apparatus as including a material bin at the upper end, and a rolling or crushing mill at the lower end.

Figure 2 is an enlarged sectional elevation of the steaming chamber revealing the angularly placed deflecting shelves within, also the steaming pipes, and the angle of repose of the material above the several shelves as it descends through the chamber passing from shelf to shelf.

Figure 3 is a sectional plan view of Figure 2 taken along the line 3—3 thereof, and also shows the steaming pipes connected up outside of the chamber and with controlling valves on the pipes.

In Figure 1 a supply bin is shown at 1 and is of the usual construction to receive grain or the like as indicated at 2, the upper surface of the grain assuming an angle of repose substantially as shown at 3.

The bin is usually supported on a floor 4, and from the bottom of the bin extends a passage or chute 5 opening directly downward to the steaming chamber 6.

The steaming chamber is preferably made of cast iron side plates suitably clamped together, and it contains angularly arranged deflecting or retarding shelves 7, 7' over which the grain descends by gravity, and also perforated steam pipes 8 passing transversely through the chamber adjacent the shelves, and the chamber discharges at the lower end directly into a feeder 9 positioned above a mill 10.

The feeder and mill are both of the conventional form the details of which are not involved in the present invention.

The mill chosen for illustration has a pair of crushing rolls 11 which are adapted to crush the material as it is received between them from the feeder, and discharge it below at 12.

The feeder here shown is of the roller feed type having its feed roll at 13, and swinging gate 14 pivoted at 15, and which controls the feed to the mill all in the well understood manner.

Any other type of feeder may be used if desired, its object being to control the passage of the material through the steaming chamber and its delivery to the mill rolls.

The inner construction of the steaming chamber is more clearly shown in Figures 2 and 3 and in which the chamber comprises a pair of side plates 15 clamped between two grooved plates 16 and held by bolts 17 passing through lugs 18 on plates 16.

Along both plates 15 are openings 19 covered by removable plates 20 secured to the plates 15 by cap screws 21, and projecting from the side plates 15 are supporting flanges 22 braced by ribs 23 for supporting the chamber on any suitable frame work arranged between the bin 1 and the mill 10.

Within the chamber are the angularly arranged deflecting shelves 7, 7', the former being centrally arranged in pairs at opposing angles with their apex at 24 so as to throw the descending material to opposite sides of the chamber, and the latter extending from opposite sides of the chamber so as to return the material to the center over the next below pair of shelves 7, and so on.

The angle of the shelves or plates is steeper than the angle of repose 3 of the material 2 as shown, and at the lower edge of several of both the inner and outer shelves are steaming pipes 8.

These pipes pass transversely through the chamber close to the material at the point where it is turned over from one shelf to the next, and the pipes are slotted or perforated at 33 along the under side through which steam is directed into the material as indicated at 25 so that as the material descends it is steamed on one side, then turned over and steamed on the other side.

Steam under low pressure is admitted to the pipes during the descent of the material, and as the chamber is not vented the steam is condensed and all absorbed by the grain.

To insure an even distribution of the steam, the pipes 8 are preferably supplied with steam from both ends through means of two stand pipes 26 both receiving steam from a common source through pipe 27, and each horizontal pair of pipes 8 is controlled by a valve 28 so that any pair may be adjusted to emit more or less steam, or cut out entirely, all depending on the amount of steaming required and the dryness of the material.

To insure a tight fit between the pipes 8 and the walls of the chamber where they pass through I screw a special flanged T 29, or L 29', at opposite ends of the pipes with a gasket 30 clamped between the flange of the fitting and the outside of the chamber walls, and this construction also aids in bolting the sides of the chamber together.

Instead of the two stand pipes and double valves on each pair of pipes 8, but one stand pipe may be used and each pair of pipes 8 individually connected at both ends by a pipe as dotted at 31.

The angularly disposed shelves are clamped between the side walls 16 of the chamber as explained and may either be positioned in grooves as are the wall plates 15 or held between little lugs cast on the inside of plates 16 as shown on one set of shelves in Figure 2 at 32, or they may be otherwise positioned.

The removable cover plates 20 provide a means of determining the condition of the material at any point in its descent, or of cleaning the apparatus as occasion may require.

In practice a row of my steaming chambers is arranged under a common bin, each leading to its particular mill, and of a capacity suitable therefor.

In contemplating my invention as set forth it will be apparent that modifications may be made in regard to the arrangement of the grain deflecting or retarding shelves, as well as the arrangement of the steam pipes, and any such modifications as fall within the spirit of my invention are intended to be covered in my appended claims.

I claim:—

1. An apparatus for steaming grain comprising a chute arranged for gravity descent of grain therethrough, angularly disposed baffles within the chute for deflecting the grain including superimposed pairs of baffles arranged in gable roof formation with upper edges abutting to prevent entrance of grain and with an open space below the lower edges permitting the grain to flow together under the lower edges of the next lower pair of baffles and over the apex thereof, and a steam pipe extending into the chute positioned under the gabled baffles at a point above any grain so flowing together and perforated along its under side for ejection of steam at the upper surface of said grain.

2. The method of treating grain for crushing which comprises forming a closed column of grain subject to controlled gravitational descent, of creating through its descent a plurality of hollow spaces within the grain body along the column maintained by its angle of repose, and of progressively treating the grain with steam applied from within said hollow spaces.

3. An apparatus for steaming grain comprising a vertically arranged chute having angularly arranged shelves therein interrupting the clear passage therethrough, said shelves being slantingly arranged in alternation to deflect the grain toward and from the central portion of the material during its passage therethrough, a plurality of steam pipes passing into the upper portion of the chute adapted for applying steam to the grain passing therethrough, a nonsteaming zone below the pipes, and an additional steaming pipe extending into the receptacle below the said zone, and means for controlling the steam to said pipes.

HORACE R. SPAULDING.